(12) United States Patent
Park

(10) Patent No.: US 10,237,383 B2
(45) Date of Patent: Mar. 19, 2019

(54) MOBILE PHONE HOLDER

(71) Applicant: Jin Kyu Park, Chungcheongnam-do (KR)

(72) Inventor: Jin Kyu Park, Cheonan-si (KR)

(73) Assignees: Jin Kyu Park, Cheonan (KR); Sang Mi Cho, Chula Vista, CA (US); Hae Mi Choi, Chula Vista, CA (US)

( * ) Notice: Subject to any disclaimer, the term of this patent is extended or adjusted under 35 U.S.C. 154(b) by 0 days.

(21) Appl. No.: 15/757,975

(22) PCT Filed: Oct. 17, 2016

(86) PCT No.: PCT/KR2016/011621
§ 371 (c)(1),
(2) Date: Mar. 7, 2018

(87) PCT Pub. No.: WO2017/069471
PCT Pub. Date: Apr. 27, 2017

(65) Prior Publication Data
US 2018/0241860 A1    Aug. 23, 2018

(30) Foreign Application Priority Data

Oct. 20, 2015    (CN) ...................... 2015 2 0816187 U

(51) Int. Cl.
*H04M 1/00* (2006.01)
*H04B 1/38* (2015.01)
*H04M 1/04* (2006.01)

(52) U.S. Cl.
CPC .................................... *H04M 1/04* (2013.01)

(58) Field of Classification Search
CPC .... H04M 1/04; H04M 1/0202; H04M 1/6041; H04M 1/6075; H04B 1/3877; H04B 1/3888
USPC .................................. 455/90.3, 575.1, 575.4
See application file for complete search history.

(56) References Cited

U.S. PATENT DOCUMENTS 5,555,302 A * 9/1996 Wang ................... B60R 11/0241
379/426
6,141,417 A * 10/2000 Lopez ..................... A45F 5/021
379/446
7,158,092 B2 * 1/2007 Shen ....................... H04M 1/04
343/878

(Continued)

FOREIGN PATENT DOCUMENTS

JP    2009152500 A    7/2009
KR    200468496 Y1    8/2013
(Continued)

*Primary Examiner* — Quochien B Vuong
(74) *Attorney, Agent, or Firm* — Patent Office of Dr. Chung Park

(57) ABSTRACT

The present invention relates to a mobile phone holder including a base, the holder: providing a flexible sheet and a sliding device so as to allow the fingers to pass through the arch-shaped flexible sheet during one-handed operations; making one-handed operations easier so as to prevent the mobile phone from dropping during one-handed operations; and allowing the height of the flexible sheet provided in an arch shape to be adjusted, thereby enabling the mobile phone to be put directly on a loading surface and allowing a user to freely use both hands.

6 Claims, 2 Drawing Sheets

(56) References Cited

U.S. PATENT DOCUMENTS

| | | | | |
|---|---|---|---|---|
| 7,238,042 B2* | 7/2007 | Chen | ................... | H04B 1/3888 |
| | | | | 439/374 |
| 7,532,916 B2* | 5/2009 | Lee | ................... | H04M 1/0216 |
| | | | | 455/575.4 |
| 7,801,572 B2* | 9/2010 | Bury | ................... | B60R 11/0241 |
| | | | | 455/575.1 |
| 7,861,985 B2* | 1/2011 | Galvin | ................... | F16M 11/40 |
| | | | | 455/575.1 |
| 7,920,905 B2* | 4/2011 | Bury | ................... | B60R 11/0241 |
| | | | | 455/575.4 |
| 8,116,832 B2* | 2/2012 | Wang | ................... | H04B 1/385 |
| | | | | 455/575.1 |
| 8,638,557 B2* | 1/2014 | Tsai | ................... | F16M 11/041 |
| | | | | 248/919 |
| 9,901,151 B2* | 2/2018 | Marvin | ................... | A45C 11/00 |
| 9,942,369 B2* | 4/2018 | Sadai | ................... | G06F 1/16 |
| 2014/0213328 A1 | 7/2014 | Faulk | | |
| 2015/0318885 A1* | 11/2015 | Earle | ................... | H04B 1/385 |
| | | | | 455/575.6 |

FOREIGN PATENT DOCUMENTS

| | | |
|---|---|---|
| KR | 101390427 B1 | 4/2014 |
| KR | 1020140136598 A | 12/2014 |

\* cited by examiner

MOBILE PHONE HOLDER

TECHNICAL FIELD

The present invention relates to a technical field of a mobile phone part, and more particularly, to a mobile phone holder, which enables a user to freely use his or her hands and to easily manipulate a mobile phone with one hand.

BACKGROUND ART

As application of mobile devices, such as cell phones, in social life grows more comprehensive, frequency in use of the mobile devices is increasing more and more. However, when a user holds a cell phone in his or her hand for a long time, the user feels a burden. Especially, using of the mobile device in a specific pace or using a smart phone navigation during driving may bring danger with the user because the user cannot freely use his or her two hands. Moreover, as mobile phone operating systems and touch screen technology advance more and more, users feel difficulty in manipulating their mobile phones with one hand due to an increase of a screen size. In the case of women with small hands or persons who use mobile phones before going to bed, they may easily drop their phones because it is difficult to manipulate the phones with one hand.

However, there is no effective method of solution on the above-mentioned problems till now.

DISCLOSURE

Technical Problem

Accordingly, the present invention has been made in view of the above-mentioned problems occurring in the prior art, and it is an object of the present invention to provide a mobile phone holder, which enables a user to freely use his or her hands and to easily manipulate a mobile phone with one hand.

Technical Solution

To accomplish the above object, according to the present invention, there is provided a mobile phone holder including: a base; a flexible sheet and a transparent adhesive sheet respectively mounted on the top surface and the bottom surface of the base; sliding units respectively mounted at right and left end portions of the bottom surface of the flexible sheet; a closed type chute and an open type chute mounted to be matched with the sliding units at the corresponding positions of the right and left end portions of the base; an opening formed in the base corresponding to the right end of the closed type chute to communicate with the closed type chute; a tiered concave groove formed adjacent to the opening at the closed type chute; and a closed type ring-shaped boss and an open type arc-shaped boss, which are respectively mounted at the corresponding positions of the base located at the bottom surface of the closed type chute and the base located at the bottom surface of the open type chute to be matched with the sliding units, wherein the sliding units includes a rectangular boss fixed and connected to the flexible sheet, the rectangular boss is fixed and connected with an arc-shaped boss through a connection pole, and the diameter of the connection pole is smaller than the minimum width of the closed type chute and the open type chute.

Furthermore, the outer diameter of the arc-shaped boss is smaller than or equal to the inner diameter of the opening.

Moreover, right and left end portions of the closed type ring-shaped boss have a semicircular structure, and the inner diameter of the semicircular structure of the closed type ring-shaped boss is larger than the outer diameter of the ring-shaped boss.

Additionally, the inner diameter of the open type ring-shaped boss is larger than the outer diameter of the ring-shaped boss.

Moreover, the flexible sheet is made of silica gel.

In addition, the base is made of polycarbonate.

Advantageous Effects

As described above, the mobile phone holder according to an embodiment of the present invention includes the flexible sheet and the sliding unit mounted to allow the user's fingers to pass through the arch-shaped flexible sheet during one-handed operations and to make one-handed operations easier, thereby preventing the mobile phone from dropping down during one-handed operations. Moreover, the mobile phone holder according to an embodiment of the present invention allows the user to adjust the height of the arch-shaped part of the flexible sheet such that the user can put the mobile phone on a loading surface and freely use his or her both hands.

DESCRIPTION OF DRAWINGS

Hereinafter, necessary drawings for exemplary embodiments will be described in brief in order to clearly describe technical solutions of embodiments of the present invention or cited references. The attached drawings described hereinafter are just some examples of the present invention, and those skilled in the art may obtain other drawings based on the attached drawings on the assumption that those skilled in the art will not try to make inventive step utilizing the drawings.

MODE FOR INVENTION

Hereinafter, technical solutions of embodiments of the present invention will be clearly and perfectly described with reference to the attached drawings. The embodiments are just exemplary and do not mean all kinds of embodiments of the present invention. It should be appreciated that all of other embodiments obtainable on the basis of embodiments of the present invention by those skilled in the art belong to the protective scope of the present invention.

Figure 1:
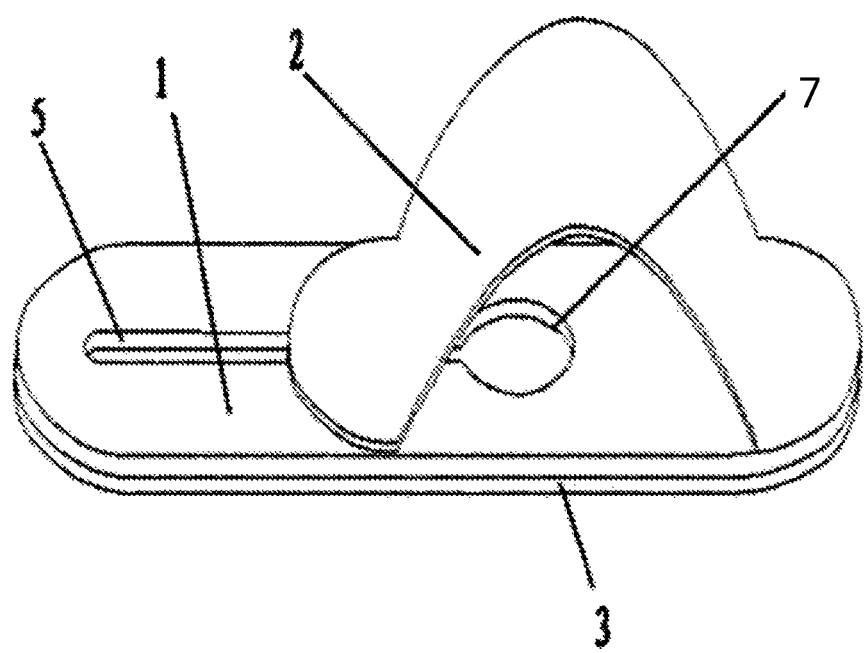
FIG. 1 is a structure diagram of a mobile phone holder according to a preferred embodiment of the present invention.
Figure 2:
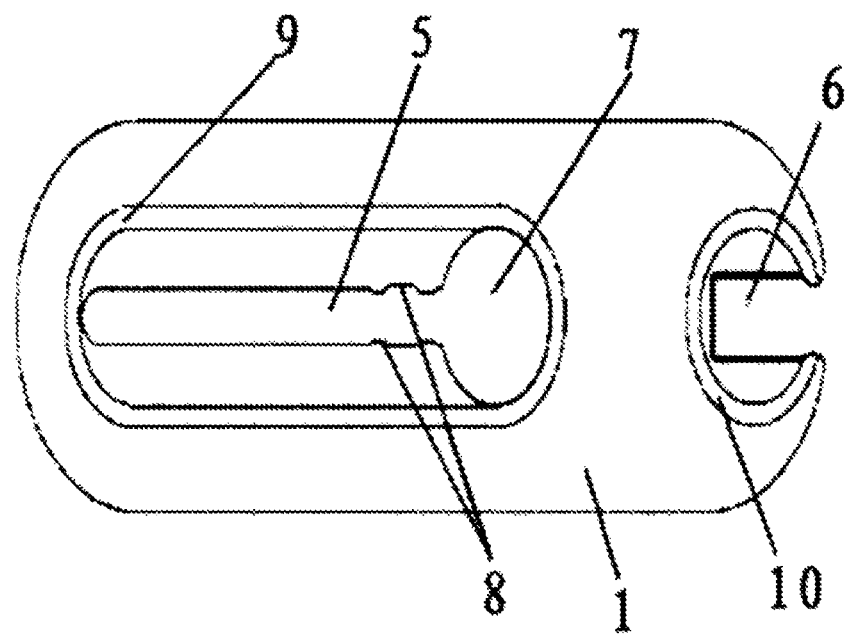
FIG. 2 is a structure diagram of a base of the mobile phone holder according to the preferred embodiment of the present invention.
Figure 3:
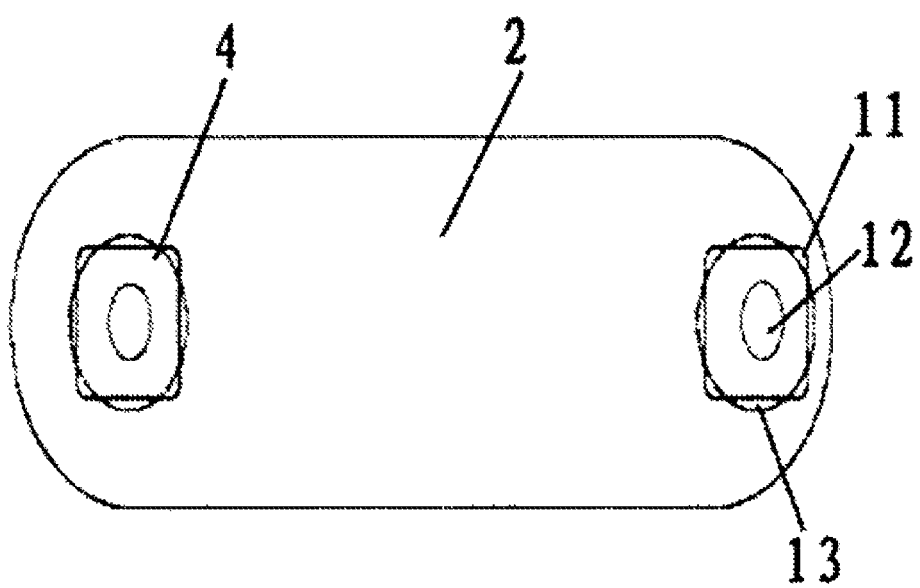
FIG. 3 is a structure diagram of a flexible sheet of the mobile phone holder according to the preferred embodiment of the present invention.

As shown in FIGS. 1 to 3, a mobile phone holder according to an embodiment of the present invention includes: a base 1; a flexible sheet 2 and a transparent adhesive sheet 3 respectively mounted on the top surface and the bottom surface of the base 1; sliding units 4 respectively mounted at right and left end portions of the bottom surface of the flexible sheet 2; a closed type chute 5 and an open type chute 6 mounted to be matched with the sliding units 4 at the corresponding positions of the right and left end portions of the base 1; an opening 7 formed in the base 1 corresponding to the right end of the closed type chute 5 to communicate with the closed type chute 5; a tiered concave groove 8 formed adjacent to the opening 7 at the closed type chute 5; and a closed type ring-shaped boss 9 and an open type arc-shaped boss 10, which are respectively mounted at the corresponding positions of the base 1 located at the bottom surface of the closed type chute 5 and the base 1 located at the bottom surface of the open type chute 6 to be matched with the sliding units 4, wherein the sliding units 4 includes a rectangular boss 11 fixed and connected to the flexible sheet 2, the rectangular boss 11 is fixed and connected with an arc-shaped boss 13 through a connection pole 12, and the diameter of the connection pole 12 is smaller than the minimum width of the closed type chute 5 and the open type chute 6.

In an embodiment, the outer diameter of the arc-shaped boss 13 is smaller than or equal to the inner diameter of the opening 7.

In an embodiment, right and left end portions of the closed type ring-shaped boss 9 have a semicircular structure, the inner diameter of the semicircular structure of the closed type ring-shaped boss 9 is larger than the outer diameter of the ring-shaped boss 13.

In an embodiment, the inner diameter of the open type ring-shaped boss 10 is larger than the outer diameter of the ring-shaped boss 13.

In an embodiment, the flexible sheet 2 is made of silica gel.

In an embodiment, the base 1 is made of polycarbonate.

For easy understanding of the technical solution of the present invention, the technical solution of the present invention will be described in detail through the following application method.

In the case of an application of the mobile phone holder according to the present invention, because the sliding units 4, the closed type chute 5, and the open type chute 6 can adjust the height of the arch-shaped part of the flexible sheet 2, the height of the arch-shaped part of the flexible sheet 2 is adjusted as the user wants when the user wants to release the mobile phone in a state where the user's fingers passed through the arch-shaped surface, such that the flexible sheet 2 can directly support the mobile phone.

Overall, the mobile phone holder according to an embodiment of the present invention includes the flexible sheet and the sliding unit mounted to allow the user's fingers to pass through the arch-shaped flexible sheet during one-handed operations and to make one-handed operations easier, thereby preventing the mobile phone from dropping down during one-handed operations. Moreover, the mobile phone holder according to an embodiment of the present invention allows the user to adjust the height of the arch-shaped part of the flexible sheet such that the user can put the mobile phone on a loading surface and freely use his or her both hands.

As described above, while the present invention has been described with reference to the particular illustrative embodiments, it is not to be restricted by the embodiments. It is to be appreciated that all changes, modifications, and equivalents should be construed as belonging to the scope of the present invention without departing from the scope and spirit of the invention.

The invention claimed is:

1. A mobile phone holder comprising:
    a base;
    a flexible sheet and a transparent adhesive sheet respectively mounted on a top surface and a bottom surface of the base;
    sliding units respectively mounted at right and left end portions of the bottom surface of the flexible sheet;
    a closed type chute and an open type chute mounted to be matched with the sliding units at corresponding positions of right and left end portions of the base;
    an opening formed in the base to communicate with the closed type chute; and
    a tiered concave groove formed in the closed type chute extending from the opening;
    wherein the sliding units include a first boss fixed and connected to the flexible sheet, the first boss is connected to the flexible sheet through a connection pole, and a diameter of the connection pole is smaller than a minimum width of the closed type chute and the open type chute.

2. The mobile phone holder according to claim 1, further comprising:
    an arc-shaped boss connected to the first boss through the connection pole; and
    a closed type ring-shaped boss formed on the base,
    wherein an outer diameter of the arc-shaped boss is smaller than or equal to an inner diameter of the opening.

3. The mobile phone holder according to claim 2, wherein right and left end portions of the closed type ring-shaped boss have a semicircular structure, and an inner diameter of the semicircular structure of the closed type ring-shaped boss is larger than an outer diameter of the arc-shaped boss.

4. The mobile phone holder according to claim 2, further comprising:
    an open-type arc-shaped boss formed on the base,
    wherein an inner diameter of the open type arc-shaped boss is larger than an outer diameter of the arc-shaped boss.

5. The mobile phone holder according to claim 1, wherein the flexible sheet is made of silica gel.

6. The mobile phone holder according to claim 1, wherein the base is made of polycarbonate.

* * * * *